US012610392B2

(12) United States Patent
Balakrishna

(10) Patent No.: US 12,610,392 B2
(45) Date of Patent: Apr. 21, 2026

(54) TELECOMMUNICATION NETWORK RESOURCE ALLOCATION USING ASSIGNED TEMPORARY IDENTIFIERS SYSTEMS AND METHODS

(71) Applicant: T-Mobile USA, Inc., Bellevue, WA (US)

(72) Inventor: Reman Pezhumkad Balakrishna, Nutley, NJ (US)

(73) Assignee: T-Mobile USA, Inc., Bellevue, WA (US)

( * ) Notice: Subject to any disclaimer, the term of this patent is extended or adjusted under 35 U.S.C. 154(b) by 492 days.

(21) Appl. No.: 17/978,893

(22) Filed: Nov. 1, 2022

(65) Prior Publication Data

US 2024/0147519 A1 May 2, 2024

(51) Int. Cl.
*H04W 8/20* (2009.01)
*H04W 8/24* (2009.01)
*H04W 72/566* (2023.01)

(52) U.S. Cl.
CPC ......... *H04W 72/566* (2023.01); *H04W 8/205* (2013.01); *H04W 8/24* (2013.01)

(58) Field of Classification Search
None
See application file for complete search history.

(56) References Cited

U.S. PATENT DOCUMENTS

| | | | |
|---|---|---|---|
| 8,868,722 B2 | 10/2014 | Giese et al. | |
| 9,198,083 B1 * | 11/2015 | Rai | H04W 68/12 |
| 9,230,106 B2 | 1/2016 | Eliseev et al. | |
| 9,251,506 B2 | 2/2016 | Benjamin et al. | |
| 9,445,236 B2 | 9/2016 | Aleksy et al. | |
| 9,830,397 B2 | 11/2017 | Sadovsky | |
| 9,942,779 B1 | 4/2018 | Proctor et al. | |
| 10,148,685 B2 | 12/2018 | Hassanzadeh et al. | |
| 10,206,102 B2 * | 2/2019 | Luft | H04W 12/08 |

(Continued)

FOREIGN PATENT DOCUMENTS

| | | |
|---|---|---|
| CN | 100387092 C | 5/2008 |
| CN | 107533504 A | 1/2018 |

(Continued)

*Primary Examiner* — Khaled M Kassim
*Assistant Examiner* — Ahmed Saifuddin
(74) *Attorney, Agent, or Firm* — Perkins Coie LLP

(57) ABSTRACT

Systems and methods for assigning temporary identifiers to mobile devices indicating a priority for allocation of network resources are described. A telecommunications network receives a request from a mobile device that includes an identifier for the mobile device or a subscriber associated with the mobile device. The network further receives device capability information for the mobile device and/or subscriber information for the subscriber. Using the device capability information and/or the subscriber information, the network determines a priority level for the mobile device and assigns a temporary identifier within a predetermined range based on the priority level. The network provides the temporary identifier to the mobile device, and the mobile device provides the temporary identifier to the network in subsequent communications to determine priority for allocation of network resources. The temporary identifier can be a Temporary Mobile Station Identifier (TMSI).

20 Claims, 5 Drawing Sheets

(56)     References Cited

U.S. PATENT DOCUMENTS

| 10,303,817 | B2 | 5/2019 | Sebastian et al. |
| 10,341,856 | B2 | 7/2019 | Weinberg et al. |
| 10,499,294 | B1 | 12/2019 | Tayal et al. |
| 10,600,119 | B2 | 3/2020 | Barnett et al. |
| 10,628,775 | B2 | 4/2020 | Gauthier et al. |
| 10,652,744 | B2 | 5/2020 | Avasarala et al. |
| 10,667,180 | B2 * | 5/2020 | Hurd .................. H04W 74/006 |
| 10,742,485 | B2 | 8/2020 | Rácz et al. |
| 10,805,178 | B2 * | 10/2020 | Livanos ............. H04L 41/5012 |
| 10,839,042 | B1 | 11/2020 | Dias et al. |
| 10,873,865 | B2 | 12/2020 | Chandrane et al. |
| 11,070,968 | B2 | 7/2021 | Hadadi et al. |
| 11,146,912 | B1 | 10/2021 | Portocarrero et al. |
| 11,182,220 | B2 | 11/2021 | Wiggers et al. |
| 11,323,304 | B2 | 5/2022 | Dutta et al. |
| 2011/0167357 | A1 | 7/2011 | Benjamin et al. |
| 2013/0336132 | A1 * | 12/2013 | Shaw .................. H04L 41/5003 370/252 |
| 2015/0181462 | A1 | 6/2015 | Iwai et al. |
| 2015/0195721 | A1 | 7/2015 | Costelloe |
| 2017/0359712 | A1 * | 12/2017 | Meredith ........... H04M 1/7243 |
| 2018/0213466 | A1 * | 7/2018 | Kotecha ............... H04W 60/00 |
| 2019/0287130 | A1 | 9/2019 | Lesko et al. |
| 2020/0137675 | A1 * | 4/2020 | Park .................... H04W 68/005 |
| 2020/0272518 | A1 | 8/2020 | Chen et al. |
| 2020/0342759 | A1 | 10/2020 | Moncomble |
| 2021/0343177 | A1 | 11/2021 | Coppersmith |
| 2022/0022100 | A1 * | 1/2022 | Beattie, Jr. ............ H04W 24/08 |
| 2024/0015577 | A1 * | 1/2024 | Kang ................ H04W 28/0278 |

FOREIGN PATENT DOCUMENTS

| CN | 109144870 | B | 7/2020 |
| CN | 112242991 | A | 1/2021 |
| CN | 110121154 | B | 7/2021 |
| CN | 111742540 | B | 9/2021 |
| CN | 113826092 | A | 12/2021 |
| CN | 110638422 | B | 7/2022 |
| EP | 2883405 | A2 | 6/2015 |
| EP | 2949144 | A2 | 12/2015 |
| EP | 3014555 | A2 | 5/2016 |
| EP | 3384720 | A1 | 10/2018 |
| EP | 3164663 | B1 | 11/2019 |
| EP | 2836910 | B1 | 2/2020 |
| EP | 3627790 | A1 | 3/2020 |
| EP | 3718287 | A1 | 10/2020 |
| JP | 2021044013 | A | 3/2021 |
| KR | 100985749 | B1 | 10/2010 |
| KR | 101029332 | B1 | 4/2011 |
| KR | 20140053542 | A | 5/2014 |
| WO | 2021037812 | A1 | 3/2021 |
| WO | 2021047390 | A1 | 3/2021 |
| WO | 2021252964 | A1 | 12/2021 |

* cited by examiner

300

TELECOMMUNICATION NETWORK RESOURCE ALLOCATION USING ASSIGNED TEMPORARY IDENTIFIERS SYSTEMS AND METHODS

BACKGROUND

Subscribers of telecommunications service providers communicate via one or more networks provided by the telecommunications service providers using mobile devices or other user equipment (UE). When a communication (e.g., call, message, or data transfer) is transacted via a network, one or more components or nodes of the network must allocate resources to handle the transaction. Resources can be allocated, for example, using an allocation and retention priority and/or based on an establishment cause associated with a transaction via the network.

BRIEF DESCRIPTION OF THE DRAWINGS

Detailed descriptions of implementations of the present invention will be described and explained through the use of the accompanying drawings.

Figure 1:
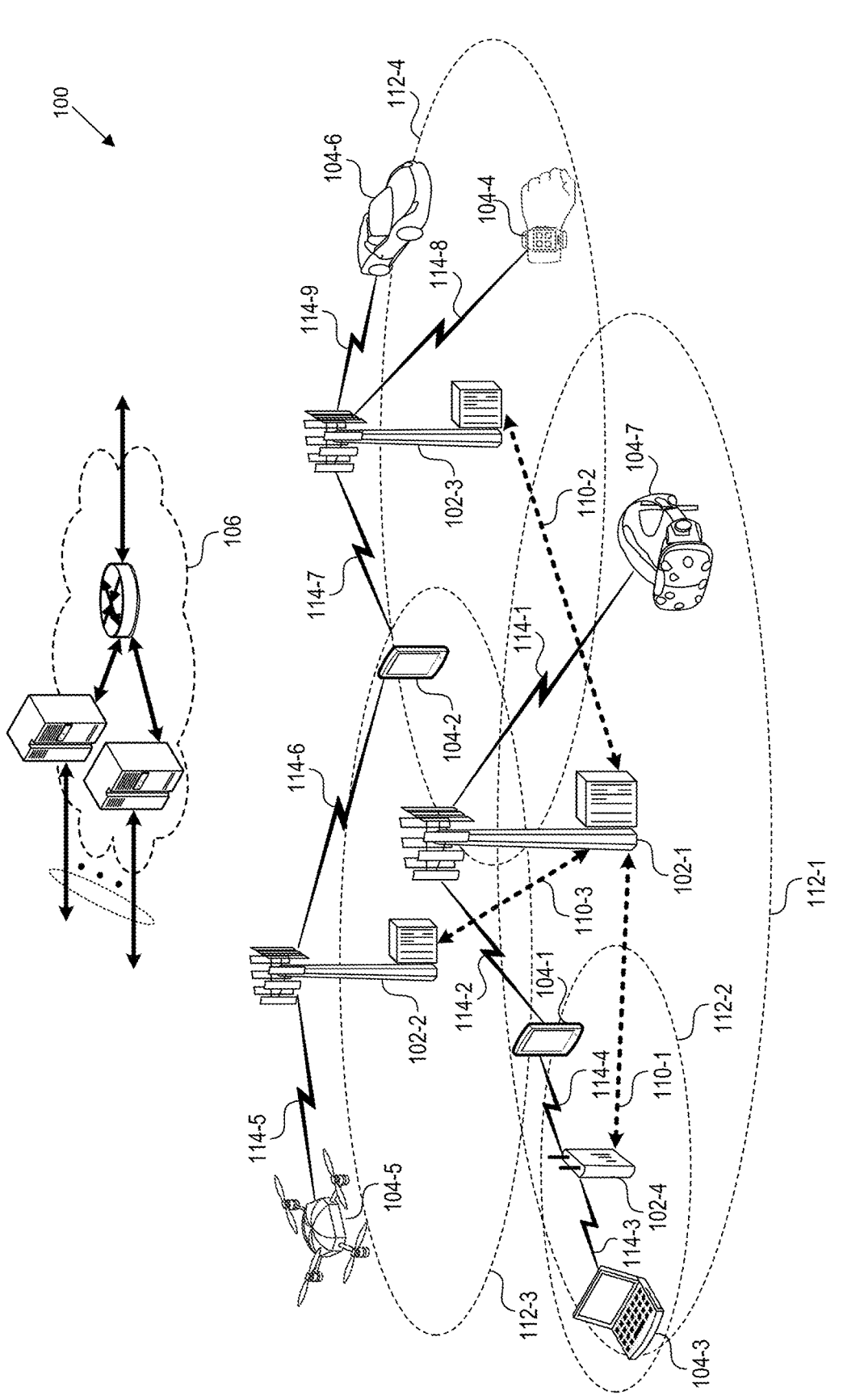
FIG. 1 is a block diagram that illustrates a wireless communications system that can implement aspects of the present technology in some implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Telecommunications service providers and other providers of communication networks face difficult technical challenges related to prioritizing the allocation of network resources, such as in response to calls, messages, data transfers, or other transactions or communications conducted via networks. Examples of existing technologies for resource allocation include allocation and retention priority (ARP), which indicates a priority level for the allocation and retention of bearers. Networks use ARP to decide whether to accept a request to establish a bearer or reject the request (e.g., when resources are limited). When performing admission control and network resources are limited, networks can use ARP, for example, to prioritize establishing or modifying bearers with a higher ARP over bearers with a lower ARP. Additionally or alternatively, existing technologies can use an establishment cause to allocate resources, which can indicate to one or more destination nodes a reason for a requested connection between a UE and a network, so that appropriate resources can be allocated for a signaling connection and subsequent usage of the signaling connection or the user plane connection.

Existing technologies are inefficient and inflexible for defining appropriate priorities when allocating network resources. For example, existing systems (e.g., using ARP-based and/or establishment cause-based technologies) randomize the priorities and further lack the ability to break ties when multiple UEs are requesting network resources and the multiple UEs have equal or approximately equal priorities. Additionally, the inflexibility of existing systems for resource allocation limit telecommunication service providers' ability to provide a variety of subscriber plan offerings, such as subscriber plans that allow certain subscriber types to be prioritized for resource allocation. For example, telecommunication service providers may wish to offer higher priority plans for business users, premium subscribers, and/or other subscriber types (e.g., first responders whose communications may be time-sensitive). Furthermore, existing systems may not allow resources to be efficiently allocated based on capabilities of mobile devices or other UE. For example, telecommunication service providers may wish to prioritize allocation of resources to devices with certain 5G/6G capabilities to enhance a subscriber's experience. By contrast, devices with fewer capabilities need not be prioritized for allocation of resources, for example, because users of these devices may be less sensitive to changes in bandwidth, network speeds, and/or other characteristics. Existing systems are also limited to using either Quality of Service (QoS) parameters or service type information indicated by radio resource control (RRC) connection establishment for determining priority between devices.

Accordingly, there is a need for a technical solution that overcomes the foregoing problems and provides other benefits. For example, there is a need for a solution that can break ties when multiple UEs have substantially similar priorities using existing technologies to allocate network resources. Additionally, there is a need for a solution that can use existing mechanisms within telecommunications environments to better allocate network resources based on predefined priority levels. Furthermore, there is a need for a solution that provides greater flexibility and granularity for defining priority levels for allocation of network resources, such as by allocating resources based on device capabilities and/or subscriber information or characteristics, or by introducing additional means of differentiating priority both for the radio access network (RAN) and core network a UE is connected to.

Disclosed herein are systems and related methods to allocate network resources using temporary identifiers ("system" or "network resource allocation system"). The system can allocate network resources based on Temporary Mobile Station Identifiers (TMSIs) assigned to mobile devices or other UE, which can alternatively be referred to as Temporary Mobile Subscriber Identities. A TMSI is the identity that is most commonly sent between a UE and a telecommunications network, rather than exchanging an International Mobile Subscriber Identity (IMSI). Whereas an IMSI is a substantially permanent identifier, which may be vulnerable to being intercepted and used to identify a particular subscriber, TMS Is are temporary. Typically, a new TMSI is assigned to a UE when an Attach procedure or a Tracking Area Update procedure is performed. Thus, using a TMSI in lieu of other identifiers makes it more difficult for an individual user to be identified (e.g., by an eavesdropper). Using existing technologies, TMSI allocation is random within an allowed range of available identifiers (e.g., between 0 to $2^{32}$−1).

However, the inventor has recognized that TMSI allocation can instead be performed according to predefined ranges that each indicate a corresponding level of priority for allocation of network resources. The network resource allocation system, thus, determines priority levels for UEs and assigns TMSIs to the UEs within predefined ranges corresponding to the determined priority levels. The system receives a message or request from a UE, which can be a message or request associated with an Attach procedure or a Tracking Area Update procedure. The message or request includes a substantially permanent identifier for the UE and/or a subscriber associated with the UE, which can be an IMSI. To determine a priority level for allocation of network resources, the system accesses device capability information for the UE and/or subscriber information for the subscriber. Using the device capability information and/or the subscriber information, the system determines the priority level for the UE, which indicates a priority for allocation of resources of the telecommunications network to the UE. Based on the determined priority level, the system assigns a temporary identifier (e.g., a TMSI) to the UE within a predetermined range of temporary identifiers. The predetermined range corresponds to the determined level of priority for the UE. The system then transmits the assigned temporary identifier to the UE, so that the UE can provide the temporary identifier to the network in subsequent messages or requests. Thus, when a subsequent message or request is received (e.g., at a network access node (NAN)) from the UE, the system can determine the level of priority for the UE based on the assigned temporary identifier, and this level of priority can be used to allocate resources to the UE in response to the subsequent message or request.

Advantages of the disclosed technology include an improved ability to allocate network resources based on priority levels for UEs. For example, the disclosed technology can assign resources based on device capability information, which can allow for enhanced subscriber experiences and/or more efficient resource allocations based on the capabilities and needs of devices. Additionally, the disclosed technology can allocate resources based on subscriber information, which can allow for certain preferred subscribers to receive higher priority for allocation of network resources. Furthermore, the disclosed technology provides for great flexibility in resource allocation while also conserving network resources because the disclosed system is able to assign resources based on temporary identifiers that UEs are already configured to provide to the network (e.g., TMSIs), rather than requiring separate messages or requests specifying priority levels.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of NAN that can also be referred to as a cell site, a base transceiver station, or a radio base station. The network 100 can include any combination of NANs including an access point, a radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions.

For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the RRC protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a UE, a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) operation (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
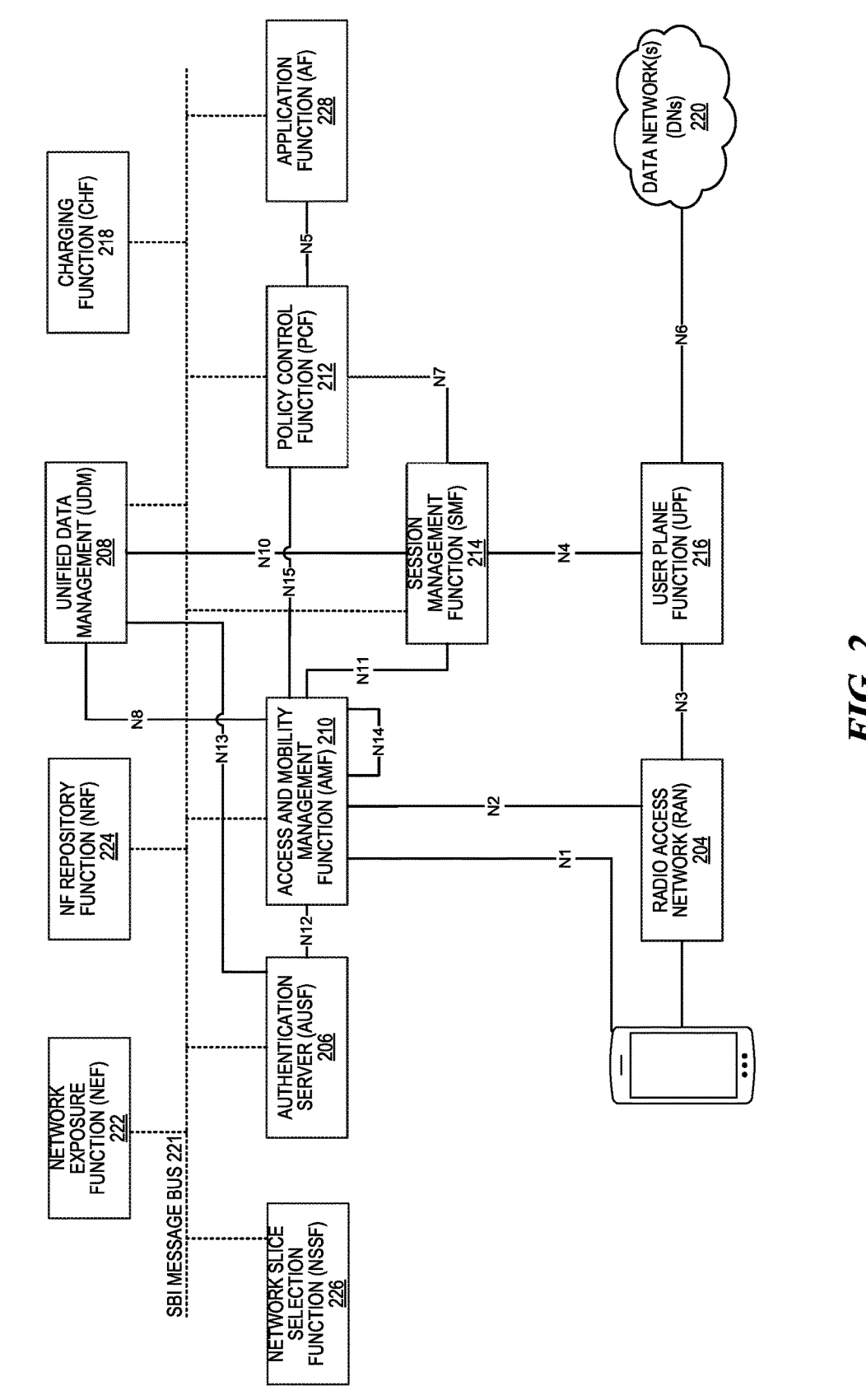
FIG. 2 is a block diagram that illustrates 5G core network functions (NFs) that can implement aspects of the present technology in some implementations.

FIG. 2 is a block diagram that illustrates an architecture 200 including 5G core NFs that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218. As used herein, PCF can also refer to a Policy and Charging Rules Function (PCRF), and AMF can also refer to Mobility Management Entity (MME).

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of NFs, once they have been successfully discovered by the NRF 224. This allows the SCP to become the delegated discovery point in a datacenter, off-loading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF

214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Temporary Identifier Assignment

Figure 3:
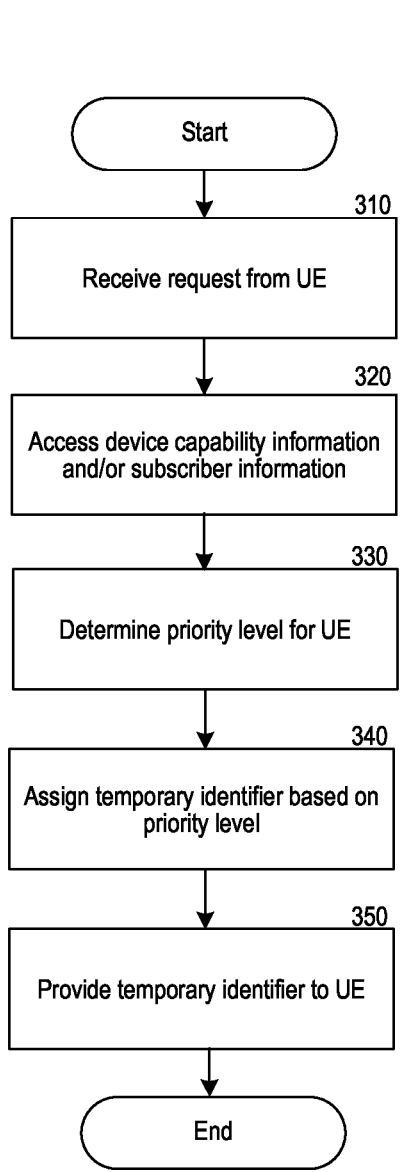
FIG. 3 is a flow diagram that illustrates a process to assign a temporary identifier to a UE based on a determined priority level in some implementations.

FIG. 3 is a flow diagram that illustrates a process 300 to assign a temporary identifier to a UE based on a determined priority level in some implementations. The process 300 can be performed by the network resource allocation system and/or using at least a portion of the network 100 of FIG. 1 and/or the architecture 200 of FIG. 2. For example, at least a portion of the process 300 can be performed by an AMF or MME that is configured to assign temporary IDs to UEs during performance of an Attach procedure or a Tracking Area Update procedure. These IDs could be randomly allocated so as to uniquely identify each UE over the S1 interface (the interface between the eNodeB (eNB) and the MME) within the MME. Once an eNB receives the ID from a UE, it can store that ID for the duration of its connection to the S1 interface and can include that ID in all signaling associated with the UE. The priority TMSI selection can then be made based on the assigned ID. The ID assignment process could also be done using any other internal identification within the RAN or the core network 106. Additionally, the UE can be a wireless device 104, as illustrated in FIG. 1.

The process 300 begins at block 310, where a request or message is received from a UE. The request or message is received at one or more nodes of a telecommunications network, such as via a NAN and/or at an AMF or MME. The request or message can relate to performance of an Attach procedure or a Tracking Area Update procedure, such as when the UE is powered on or restarted, or when the UE moves to a different geographic region. The request or message includes an identifier for the UE and/or a subscriber associated with the UE, which can be a substantially permanent identifier, such as an IMSI.

At block 320, the system accesses device capability information for the UE and/or subscriber information for the subscriber. For example, the device capability information can comprise information about a hardware or software component of the UE, information about a communication type that the UE can perform (e.g. voice, gaming, machine communication, multiple radio access ability), or information about a high privilege need the UE is equipped for. The device capability information can also include 5G or 6G capability information, whether the UE supports dual connectivity (e.g., dual connectivity with New Radio (DCNR)), whether the UE supports New Radio Standalone (NR SA), and/or whether the UE supports voice over New Radio (VoNR). The device capability information can be accessed by receiving and/or requesting capability information from the UE and from the RAN at the time of an Attach procedure or a Tracking Area Update procedure. Additional device capability information may be retrieved from an HSS, an Equipment Identity Register (EIR), or a UDM.

The subscriber information can comprise a subscriber plan associated with the subscriber. The subscriber information can be accessed and/or retrieved from a PCF, a PCRF, an HSS, or a UDM.

The system can validate that the subscriber/customer is a valid customer (e.g., is authorized to access the telecommunications network). Once a subscriber/customer is validated, the system can determine the number of component carriers, the level of radio access ability, and the device type for a UE before it can be assigned a priority level. Additional information that can help determine a priority level includes UDM info, location data, temporal data (e.g. whether the device being used during peak network traffic hours), and other device capability information.

At block 330, the system determines a priority level for the UE using the device capability information and/or the subscriber information. The priority level indicates a priority for allocation of resources of the telecommunications network to the UE. For example, different levels of priority can be assigned based on device capability information as shown in Table 1 below. Table 1 demonstrates that a device with greater capabilities (e.g., support for multiple 5G services) or a device that carries out the most important services can be prioritized for allocation of network resources, as compared to a device without support for one or more for 5G services. This ensures the most important device functions are not disrupted by network congestion.

TABLE 1

| Device Capabilities of UE | Priority Level for UE |
|---|---|
| 5G capable + DCNR + NR SA + VONR | Level 3 (highest) |
| 5G capable + DCNR + NR SA + nonVoNR | Level 2 |
| 5G capable + DCNR | Level 1 |
| None of the above | Level 0 (default) |

Additionally or alternatively, different levels of priority can be assigned based on subscriber information as shown in Table 2 below. Thus, users with different subscriber plans can be handled differently when resources are being allocated to their devices.

TABLE 2

| Subscriber Information | Priority Level for UE |
|---|---|
| Premier or Business Subscriber Plan | Level 3 (highest) |
| Family Subscriber Plan | Level 2 |
| Individual Subscriber Plan - Low Rate | Level 1 |
| Discount Subscriber Plan | Level 0 (default) |

In some implementations, determining a priority level can comprise calculating one or more scores indicating the priority level. For example, in implementations using both the device capability information and the subscriber information, a combined or weighted score can be calculated to determine the priority level.

Although certain subscriber information and device capability information is shown in Tables 1 and 2 for purposes of illustration, different subscriber information, device capability information, and/or combinations thereof can be used to determine priority levels. Additionally, although four priority levels or depicted, any number of priority levels can be used.

At block 340, the system assigns a temporary identifier to the UE based on the determined priority level for the UE. The AMF/MME can determine the temporary identifier. The temporary identifier can be, for example, a TMSI. As described herein, the temporary identifier is assigned within a predetermined range of temporary identifiers, which corresponds to the determined priority level for the UE. Table 3 below illustrates example predetermined ranges for the temporary identifiers corresponding to the priority levels illustrated in Table 1 and/or Table 2.

TABLE 3

| Priority Level for UE | Predetermined Range of Temporary Identifiers |
|---|---|
| Level 3 (highest) | 3,221,225,473 to 4,294,967,295 |
| Level 2 | 2,147,483,649 to 3,221,225,472 |
| Level 1 | 1,073,741,825 to 2,147,483,648 |
| Level 0 (default) | 0 to 1,073,741,824 |

Thus, based on the priority level, the system selects a temporary identifier to assign to the UE that is within a corresponding predetermined range of temporary identifiers, such as the predetermined ranges illustrated in Table 3 above. In some implementations, the temporary identifier can be chosen randomly within the corresponding predetermined range. In some implementations, the temporary identifier can be chosen based on a particular order or ranking within the corresponding predetermined range. For example, in some implementations, a higher value of the temporary identifier can indicate a higher priority level even within the corresponding predetermined range. That is, various sublevels of priority can be assigned and reflected in an assigned temporary identifier, such that a first UE with a temporary identifier of 4,294,967,295 (indicating a Level 3 priority level) can be given priority for allocation of resources over a second UE with a temporary identifier of 4,294,967,294 (also indicating a Level 3 priority level). However, in some implementations, the first UE and the second UE can be given equal priority for allocation of resources.

At block 350, the system provides and/or transmits the assigned temporary identifier to the UE as part of, for example, the Attach Accept/TAU Accept message. The UE can then store the assigned temporary identifier in local memory. The UE is configured to provide the assigned temporary identifier to the telecommunications network in subsequent messages or requests, such as messages or requests sent when the UE places a call or otherwise initiates a session via the network. A UE can store its history of assigned temporary identifiers to help ensure fairness exists within the process of prioritizing devices and to check the performance of the identifier system.

A person skilled in the art will appreciate that operations can be added to or removed from the process 300 while maintaining a similar functionality. Additionally, operations of the process 300 can be performed in a different order, including performing one or more operations in parallel and/or repeating one or more operations. Furthermore, the process 300 can be repeated any number of times, and typically the process 300 will be performed any time an Attach procedure or a Tracking Area Update procedure is performed for a UE. For example, when an event or scenario occurs (discussed in co-pending application Ser. No. 17/900, 826, which is incorporated by reference in its entirety), the UE can transmit an Attach/TAU procedure requesting a new priority level.

Resource Allocation Using Temporary Identifier

Figure 4:
FIG. 4 is a flow diagram that illustrates a process to allocate resources to a UE in response to a message or request from the UE that includes an assigned temporary identifier in a predetermined range in some implementations.
Figure 4:
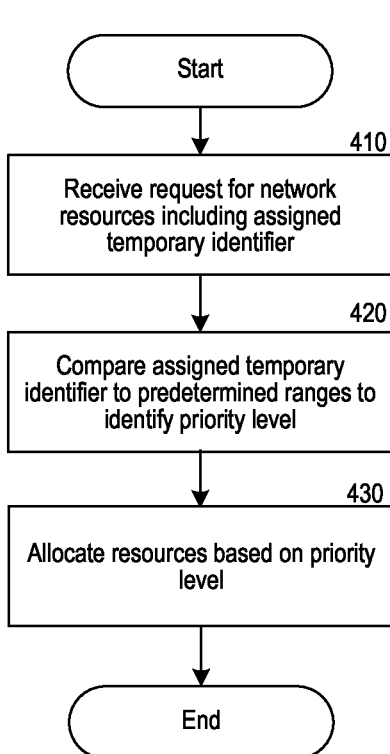

FIG. 4 is a flow diagram that illustrates a process 400 to allocate resources to a UE in response to a message or request from the user equipment that includes an assigned temporary identifier in a predetermined range in some implementations. The process 400 can be performed by the network resource allocation system and/or using at least a portion of the network 100 of FIG. 1 and/or the architecture 200 of FIG. 2. For example, at least a portion of the process 400 can be performed by a NAN of the network 100, which is configured to allocate resources in response to requests or messages from UEs (e.g., wireless devices 104) and based on a policy governing allocation of resources using assigned temporary identifiers.

The process 400 begins at block 410, where a request or message is received from a UE requesting allocation of network resources. The request or message is received at a NAN of the network, for example, when the UE places a call or otherwise initiates a session via the network. The request or message includes a temporary identifier for the UE, such as a temporary identifier assigned using the process 300 of FIG. 3. The temporary identifier can be, for example, a TMSI.

At block 420, the system compares the temporary identifier for the UE to predetermined ranges of temporary identifiers, each corresponding to a priority level. For example, the predetermined ranges and corresponding priority levels can be as illustrated in Table 3 above. Based on the comparison, the system determines a priority level for the UE. In some implementations, the system can further determine a sublevel of priority for the UE, which can provide additional priority information within the priority level for the UE. As described herein, the priority level and/or sublevel indicates relative priority for the UE when resources are being assigned to the UE.

At block 430, the system assigns resources to the UE based on the priority level and/or sublevel determined at block 420. Assigning the resources can comprise various operations, such as assigning cells and/or component carriers to handle a call or other communication. Additionally or alternatively, assigning the resources can comprise determining an order or prioritize a RRC queue and/or associated with admission control. As a further example, assigning the resources can include handling of pages, such as determining whether a page can be discarded and/or whether to retry paging. In this example, a UE that is assigned a higher priority level (e.g., Level 3) can be prioritized for paging retries and/or the system can ensure that pages for the UE are never discarded, whereas a UE with a lower priority level (e.g., Level 0) can be treated differently, such that pages can be discarded (e.g., after a certain number of unsuccessful tries). Generally speaking, the allocation of resources at block 430 is performed such that UEs with a higher priority level and/or sublevel are treated preferentially for resource allocation, as compared to UEs with a relatively lower priority level and/or sublevel.

Computing System

Figure 5:
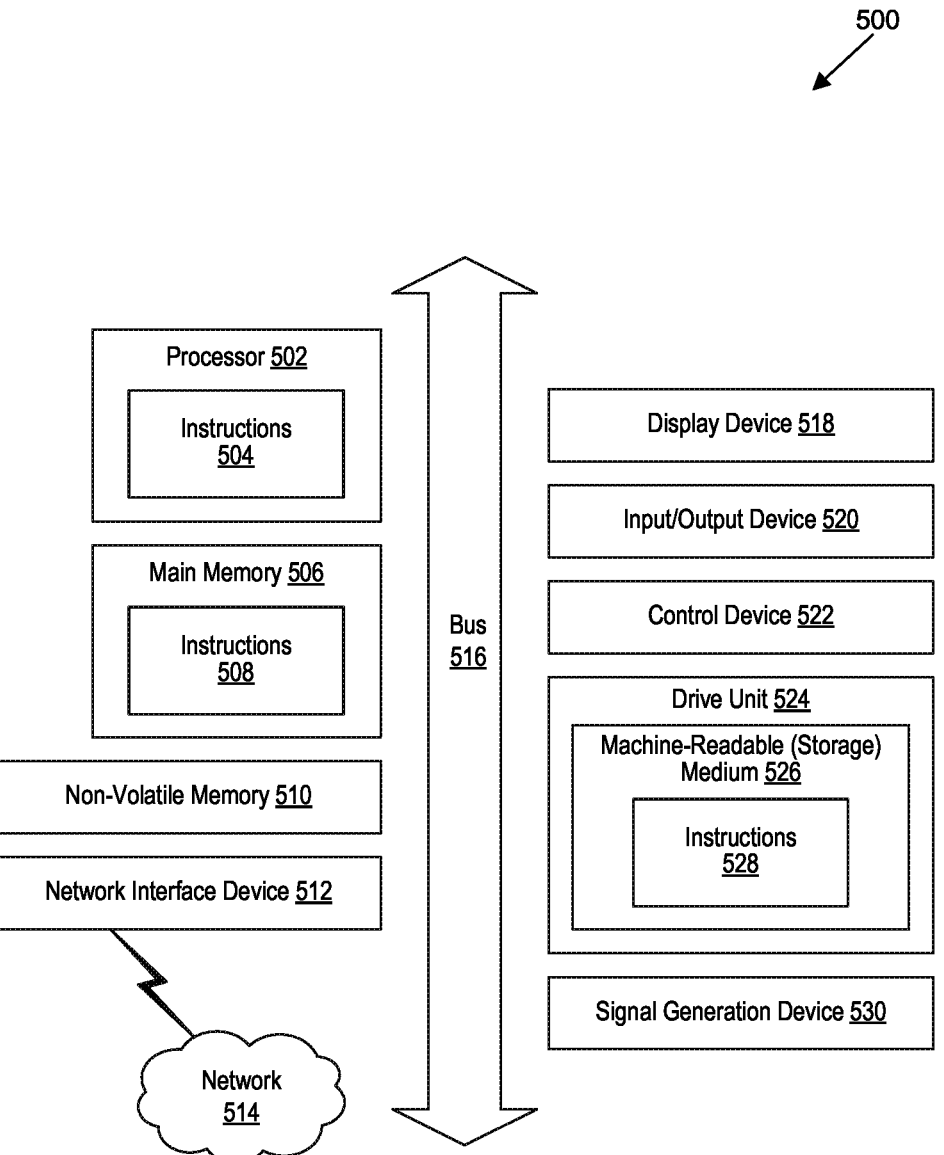
FIG. 5 is a block diagram that illustrates a computing system in which at least some operations described herein can be implemented in some implementations.

FIG. 5 is a block diagram that illustrates an example of a computing system 500 in which at least some operations described herein can be implemented. As shown, the computing system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computing system 500 is intended to illustrate a hardware device on which components are illustrated or described relative to the examples of the figures and any other components described in this specification can be implemented.

The computing system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementations, the computing system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A system comprising:
at least one hardware processor; and
at least one non-transitory memory carrying instructions that, when executed by the at least one hardware processor, cause the system to:
receive, at a node of a telecommunications network provided by a telecommunications service provider, a request from a mobile device,
wherein the request relates to performance of an Attach procedure or a Tracking Area Update procedure, and
wherein the request includes an identifier associated with the mobile device;
access device capability information of the mobile device;
access subscriber information of a subscriber associated with the mobile device;
determine, using the device capability information of the mobile device and the subscriber information of the subscriber, a priority level indicating a priority for allocation of resources of the telecommunications network to the mobile device;
assign, to the mobile device and based on the determined priority level, a temporary identifier within a predetermined range of temporary identifiers,
wherein the predetermined range of the temporary identifiers corresponds to the determined priority level for the mobile device;
transmit, to the mobile device, the assigned temporary identifier within the predetermined range, wherein the mobile device is configured to provide the assigned temporary identifier to the telecommunications network in a subsequent request for network resources;

transmit, to the mobile device, a first paging request;

determine, using the assigned temporary identifier, that the priority level associated with the mobile device is higher than a second priority level associated with a second mobile device of the telecommunications network based on the assigned temporary identifier being within the predetermined range of temporary identifiers, wherein the second mobile device is different from the mobile device; and following the first paging request and in response to determining that the priority level associated with the mobile device is higher than the second priority level, transmit a second paging request to the mobile device.

2. The system of claim 1, wherein the temporary identifier comprises a Temporary Mobile Station Identifier (TMSI).

3. The system of claim 1, wherein the instructions further cause the system to:

provide, to a network access node (NAN) of the telecommunications network, a policy governing relative priorities for allocation of network resources based on predetermined ranges of temporary identifiers assigned to mobile devices.

4. The system of claim 1, wherein the identifier associated with the mobile device comprises an International Mobile Subscriber Identity (IMSI).

5. The system of claim 1, wherein the subscriber information of the subscriber associated with the mobile device comprises a subscriber plan associated with the subscriber.

6. The system of claim 1, wherein the device capability information comprises information about a hardware or software component of the mobile device or information about a communication type that the mobile device is capable of performing.

7. The system of claim 1, wherein the subscriber information is accessed from a Policy Control Function (PCF), a Policy and Charging Rules Function (PCRF), a Home Subscriber Server (HSS), or a Unified Data Management (UDM), and the device capability information for the mobile device is received from the mobile device or from the HSS or UDM.

8. A non-transitory computer-readable medium carrying instructions that, when executed by a computing system, cause the computing system to perform operations to assign a priority level to a device, the operations comprising:

receiving, at a node of a telecommunications network, a request from a user equipment (UE), wherein the request includes an identifier associated with the UE;

accessing subscriber information of a subscriber associated with the UE;

determining, using the subscriber information for the subscriber, a priority level for the UE, wherein the priority level indicates a priority for allocation of resources of the telecommunications network to the UE;

assigning, to the UE and based on the determined priority level, a temporary identifier within a predetermined range of temporary identifiers, wherein the predetermined range of the temporary identifiers corresponds to the determined priority level for the UE;

transmitting, to the UE, the assigned temporary identifier within the predetermined range, wherein the UE is configured to provide the assigned temporary identifier to the telecommunications network in a subsequent communication;

transmit, to the UE, a first paging request;

determine, using the assigned temporary identifier, that the priority level associated with the UE is higher than a second priority level associated with a second UE of the telecommunications network based on the assigned temporary identifier being within the predetermined range of temporary identifiers, wherein the second UE is different from the UE; and following the first paging request and in response to determining that the priority level associated with the UE is higher than the second priority level, transmit a second paging request to the UE.

9. The non-transitory computer-readable medium of claim 8, wherein the temporary identifier comprises a Temporary Mobile Station Identifier (TMSI).

10. The non-transitory computer-readable medium of claim 8, wherein the operations further comprise:

providing, to a network access node (NAN) of the telecommunications network, a policy governing relative priorities for allocation of network resources based on predetermined ranges of temporary identifiers assigned to UEs.

11. The non-transitory computer-readable medium of claim 8, wherein the identifier associated with the UE comprises an International Mobile Subscriber Identity (IMSI).

12. The non-transitory computer-readable medium of claim 8, wherein the subscriber information of the subscriber associated with the UE comprises a subscriber plan associated with the subscriber.

13. The non-transitory computer-readable medium of claim 8, wherein the operations further comprise:

accessing device capability information for the UE, wherein the priority level for the UE is determined further using the device capability information for the UE.

14. The non-transitory computer-readable medium of claim 13, wherein the device capability information comprises information about a hardware or software component of the UE or information about a communication type that the UE is capable of performing.

15. The non-transitory computer-readable medium of claim 8, wherein the subscriber information is accessed from a Policy Control Function (PCF) or a Policy and Charging Rules Function (PCRF) and the node of the telecommunications network comprises an Access and Mobility management Function (AMF) or a Mobility Management Entity (MME).

16. The non-transitory computer-readable medium of claim 8, wherein received request relates to performance of an Attach procedure or a Tracking Area Update procedure.

17. A non-transitory computer-readable medium carrying instructions that, when executed by a mobile device, cause the mobile device to perform operations to receive a temporary identifier indicating a level of priority for allocation of network resources, the operations comprising:

transmitting, by a mobile device and to a telecommunications network, a message related to performance of an Attach procedure or a Tracking Area Update procedure, wherein the message includes an identifier associated with the mobile device or a subscriber associated with the mobile device;

providing, by the mobile device and to the telecommunications network, device capability information for the mobile device;

receiving, at the mobile device, an assigned temporary identifier indicating a level of priority for the mobile device, wherein the assigned temporary identifier is within a predetermined range of temporary identifiers indicating the level of priority, and wherein the assigned temporary identifier is determined by a node of the telecommunications network using the provided device capability information;

storing the assigned temporary identifier at the mobile device;

providing, by the mobile device, the assigned temporary identifier to the telecommunications network in a request for allocation of network resources, wherein the telecommunications network is configured to allocate the network resources based on the level of priority for the mobile device indicated by the assigned temporary identifier;

transmit, to the mobile device, a first paging request;

determine, using the assigned temporary identifier, that the level of priority associated with the mobile device is higher than a second level of priority associated with a second mobile device of the telecommunications network based on the assigned temporary identifier being within the predetermined range of temporary identifiers, wherein the second mobile device is different from the mobile device; and following the first paging request and in response to determining that the level of priority associated with the mobile device is higher than the second level of priority, transmit a second paging request to the mobile device.

18. The non-transitory computer-readable medium of claim 17, wherein the identifier associated with the mobile device or the subscriber comprises an International Mobile Subscriber Identity (IMSI) and the assigned temporary identifier comprises a Temporary Mobile Station Identifier (TMSI).

19. The non-transitory computer-readable medium of claim 17, wherein the assigned temporary identifier is determined by the node of the telecommunications network further using subscriber information for the subscriber retrieved from a Policy Control Function (PCF) or a Policy and Charging Rules Function (PCRF).

20. The non-transitory computer-readable medium of claim 17, wherein the node of the telecommunications network comprises an Access and Mobility management Function (AMF) or a Mobility Management Entity (MME).

* * * * *